United States Patent
Garey

(10) Patent No.: US 6,662,302 B1
(45) Date of Patent: Dec. 9, 2003

(54) METHOD AND APPARATUS OF SELECTING ONE OF A PLURALITY OF PREDETERMINED CONFIGURATIONS USING ONLY NECESSARY BUS WIDTHS BASED ON POWER CONSUMPTION ANALYSIS FOR PROGRAMMABLE LOGIC DEVICE

(75) Inventor: Kenneth E. Garey, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/408,825

(22) Filed: Sep. 29, 1999

(51) Int. Cl.⁷ .............................. G06F 1/26; G06F 1/32
(52) U.S. Cl. ..................... 713/324; 713/320; 713/323; 713/340; 713/1; 713/2; 713/100
(58) Field of Search ................................ 713/1, 2, 100, 713/300, 320, 322, 323, 324, 330, 340; 326/38, 39

(56) References Cited

U.S. PATENT DOCUMENTS

| | | | |
|---|---|---|---|
| 5,497,498 A | | 3/1996 | Taylor |
| 5,535,406 A | * | 7/1996 | Kolchinsky ............... 712/10 |
| 5,537,295 A | | 7/1996 | Van Den Bout et al. |
| 5,737,631 A | * | 4/1998 | Trimberger ............... 712/37 |
| 5,751,164 A | * | 5/1998 | Sharpe-Geisler et al. ..... 326/38 |
| 5,841,810 A | * | 11/1998 | Wong et al. ............... 330/304 |
| 5,887,165 A | * | 3/1999 | Martel et al. ............. 709/221 |
| 5,931,959 A | * | 8/1999 | Kwiat ..................... 714/11 |
| 5,933,642 A | * | 8/1999 | Greenbaum et al. ......... 712/1 |
| 5,956,518 A | * | 9/1999 | DeHon et al. ............. 712/15 |
| 5,996,083 A | * | 11/1999 | Gupta et al. ............. 713/322 |
| 6,134,707 A | * | 10/2000 | Herrmann et al. ......... 709/208 |
| 6,172,518 B1 | * | 1/2001 | Jenkins et al. ........... 326/37 |
| 6,175,434 B1 | * | 1/2001 | Feng ..................... 359/152 |
| 6,198,304 B1 | * | 3/2001 | Sasaki ................... 326/39 |
| 6,314,551 B1 | * | 11/2001 | Borland .................. 716/17 |
| 6,421,728 B1 | * | 7/2002 | Mohammed et al. ......... 709/227 |

FOREIGN PATENT DOCUMENTS

JP 04282475 A * 10/1992 .......... G01R/31/318

OTHER PUBLICATIONS

Tannenbaum, Andrew S., Structured Computer Organization, 1984, Prentice–Hall, pp. 10–12.*

(List continued on next page.)

*Primary Examiner*—Thomas Lee
*Assistant Examiner*—James K. Trujillo
(74) *Attorney, Agent, or Firm*—Christopher J. Rourk; Akin Gump Strauss Hauer & Feld, LLP

(57) ABSTRACT

A signal processor that contains a programmable logic circuitry that is re-configurable in response to various parameters including, but not limited to, characteristics of a plurality of input data that is provided to the signal processor. The signal processor contains, among other things, a programmable logic configuration circuitry that provides a logic configuration to the programmable logic circuitry. In certain embodiments of the invention, the signal processor employs a wide word width to program the programmable logic circuitry, the wide word width is operable to configure an entirety of the programmable logic circuitry. The programmable logic configuration circuitry further contains a default configuration circuitry and an adaptive configuration circuitry. The default configuration circuitry contains a default logic configuration for the programmable logic circuitry. In other embodiments of the invention, the adaptive configuration circuitry generates an adaptive logic configuration for the programmable logic circuitry. The programmable logic circuitry is partitioned into a plurality of areas, each area within the plurality of areas is independently programmable.

19 Claims, 7 Drawing Sheets

OTHER PUBLICATIONS

Endler, M.; Wei, J.; "Programming generic dynamic reconfigurations for distributed applications", Configurable Distributed Systems, 1992., International Workshop on, Mar. 25–27, 1992, Page(s): 68–79.*

Andre DeHon, "DPGA–Coupled Microprocessors: Commodity IC's for the Early $21^{st}$ Century," *Mit Transit Note #100*, Jan. 1994 (12 pages).

Ray Bittner and Peter Athanes, "Wormhole Run–time Reconfiguration," (8 pages).

Stan baker, " Programming Silicon: Dynamic Reinvention," *Electronic Engineering Times*, Aug. 28, 1995, p. 73.

W.D. Zhong, S. Dods, J.P.R. Lacey and R.S. Tucker, "Reconfigurable Multichannel Add–drop Multiplexer with Improved Performance," *IEE 1996, Electronics Letters Online, No. 19960989*, May 1996, (2 pages).

D.M. Budgett, P.E. Tang, J.H. Sharp, C.R. Chatwin, R.C.D. Young, R.K. Wang and B.F. Scott, "Parallel Pixel Processing using Programmable Gate Arrays," *IEEE 1996, Electronic Letters Online, No. 19961025*, Jun. 1996 (2 pages).

Phil Lapsley and Garrick Blalock, "How to Estimate DSP Performance," *IEEE Spectrum*, Jul. 1996, pp. 74–78.

David M. James, "Reconfigurable Pipeline for Fast, Versatile Computation," *IEEE, 1998*, pp. 1710–1713.

Edward A. Acosta, V. Michael Bove, Jr., John A Watlington, and Ross A Yu, "Reconfigurable Processor for Data–Flow Video Processing System," *SPIE*, vol. 2607, 1995, pp. 83–89.

Ian Page, "Reconfigurable Processor Architectures," *Elsevier: Microprocessors and Microsystems*, vol. 20, 1996, pp. 185–196.

Bradley K. Fawcett, "FPGAs in Reconfigurable Computing Applications," pp. 261–266.

* cited by examiner

METHOD AND APPARATUS OF SELECTING ONE OF A PLURALITY OF PREDETERMINED CONFIGURATIONS USING ONLY NECESSARY BUS WIDTHS BASED ON POWER CONSUMPTION ANALYSIS FOR PROGRAMMABLE LOGIC DEVICE

BACKGROUND

1. Technical Field

The present invention relates generally to data processing; and, more particularly, it relates to data processing that employs reconfigurable logic circuitry.

2. Related Art

Conventional systems that perform data processing do not possess the ability to adapt to various data types on which a data processor must operate. Specific application specific integrated circuitry or other processing circuitry geared and designed to execute specific and limited applications do provide for extremely fast processing, but at a cost of significantly limited functionality. In addition, present signal processors do not provide hardware oriented solutions. For each computational operations within modern signal processors, the signal processor performs multiple functions including a program random access memory (RAM) or a program read only memory (ROM). The conventional signal processor must also employ a data random access memory (RAM) or a plurality of data registers, several address buses and data buses, a data address unit, and a predetermined data path.

Conventional signal processors that employ hardware directed solutions typically provide a limited functionality to a plurality of input data and drive that plurality of input data to a next function. In other words, conventional hardware solutions are geared primarily to perform a very limited number of functions. Limitations of general purpose signal processors employing conventional techniques are numerous; however, a main limitation is an inability to perform a substantially wide variety of operations to accommodate various pluralities of input data. To perform a wide variety of functions, conventional signal processors typically need to perform a large number of gate toggles with each operation.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a signal processor having a programmable logic circuitry that operates on a plurality of data. The signal processor contains, among other things, a programmable logic configuration circuitry that provides a logic configuration to the programmable logic circuitry. In certain embodiments of the invention, the signal processor employs a wide word width to program the programmable logic circuitry, the wide word width is operable to configure an entirety of the programmable logic circuitry. The programmable logic configuration circuitry further contains a default configuration circuitry and an adaptive configuration circuitry. The default configuration circuitry contains a default logic configuration for the programmable logic circuitry. In other embodiments of the invention, the adaptive configuration circuitry generates an adaptive logic configuration for the programmable logic circuitry. The programmable logic circuitry is partitioned into a plurality of areas. Each area within the plurality of areas is independently programmable with the logic configuration.

In addition, in certain embodiments of the invention, a first logic configuration, provided from an active configuration circuitry, is used to program the programmable logic configuration circuitry while a second logic configuration is simultaneously being loaded into a loading configuration circuitry. In certain embodiments of the invention, the loading configuration circuitry is a memory buffer that receives the other logic configuration while the first logic configuration is used to program the programmable logic configuration circuitry thereby providing extremely fast operation within the signal processor.

Other aspects, advantages and novel features of the present invention will become apparent from the following detailed description of the invention when considered in conjunction with the accompanying drawings.

DETAILED DESCRIPTION

The present invention presents a solution that provides operation within a signal processor with a significantly reduced number of gate toggles for a given operation. A relatively complex data path is generated for a plurality of input data to reduce the number of gate toggles required to perform operation on the plurality of data. in certain embodiments of the invention, the complex data path is a 64 bit deeply pipelined parallel serial data path with rich interconnects between the pipeline levels and the adjacent data paths within the signal processor. In other embodiments of the invention, the data path provides interconnects capable of allowing multiple 8 bit, 16 bit, or 32 bit parallel operations to occur in parallel. Serial operations including up to 'n'×16 bit serial multiples with adjacent signal summing is also provided within various embodiments of the invention.

Control of the depth of the deeply pipelined parallel serial data path and a clock signal's gating is also provided within the invention.

Similar programmability is also provided within a data addressing unit in other embodiments of the invention. This programmability facilitates content addressable data and coordinates re-mapping address support within the signal processor. A program sequencer employs re-configuration to allow flexible control over the data path and the addressing unit. Wide word access is provided to allow rapid re-configuration of a programmable logic circuitry. A hardwired, or default, logic configuration is provided for multiple components within the signal processor. In addition, re-configuration is provided for the multiple components within the signal processor using direct memory access (DMA) logic having wide word read only memory (ROM) and random access memory (RAM).

Figure 1:
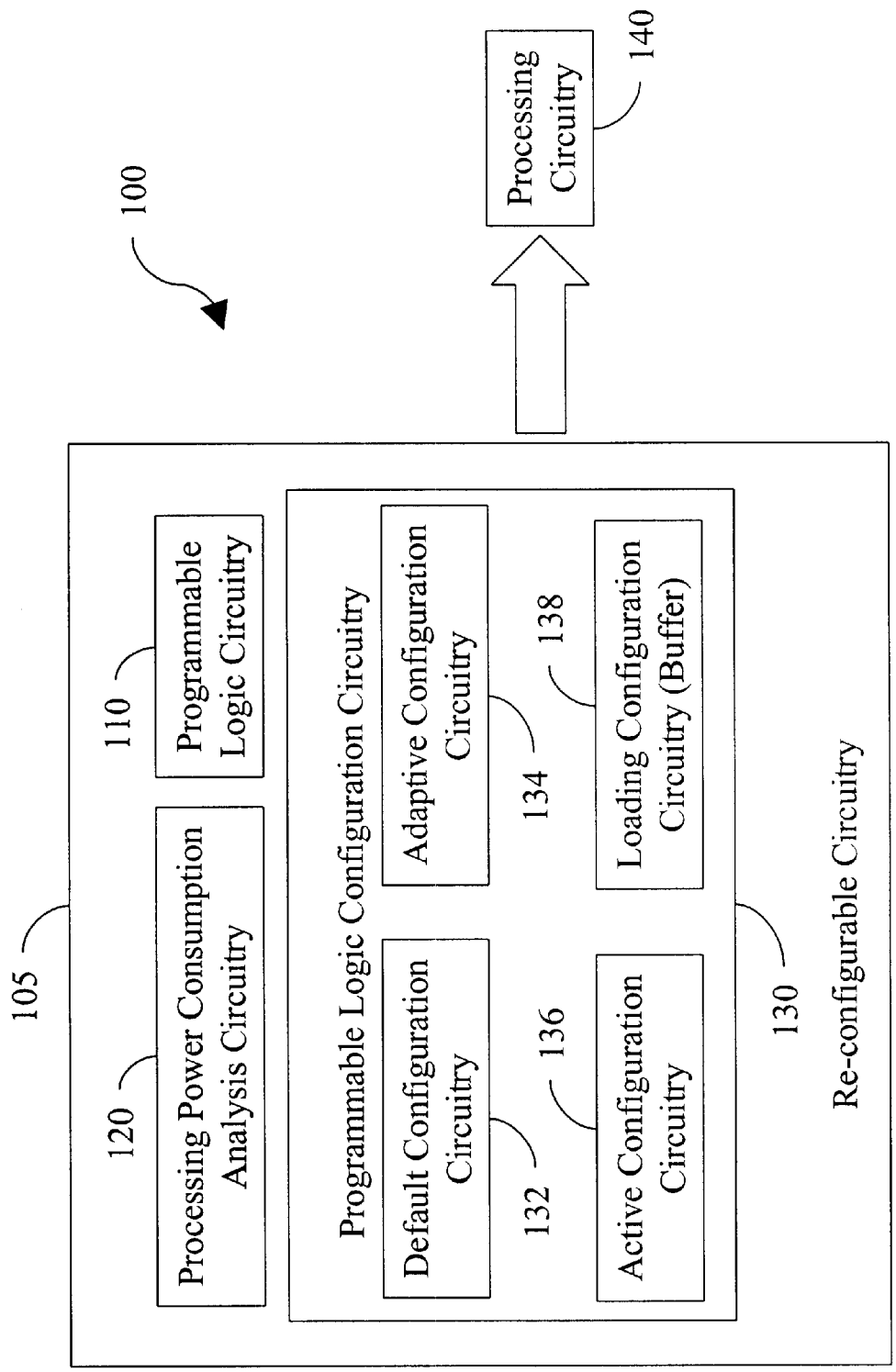
FIG. 1 is a system diagram illustrating a signal processor built in accordance with the invention having a processing circuitry that contains a re-configurable circuitry.

FIG. 1 is a system diagram illustrating a signal processor 100 built in accordance with the invention having a processing circuitry 140 that contains a re-configurable circuitry 105. The processing circuitry 140 of the signal processor 100 contains the re-configurable circuitry 105 to perform at least a portion of its total signal processing. The re-configurable circuitry 105 contains, among other things, a programmable logic circuitry 110, a processing power consumption analysis circuitry 120, and a programmable logic configuration circuitry 130. The programmable logic configuration circuitry 130 itself contains, among other things, a default configuration circuitry 132, an adaptive configuration circuitry 134, an active configuration circuitry 136, and a loading configuration circuitry (buffer) 138. The programmable logic configuration circuitry 130 selects a predetermined logic configuration from among a predetermined plurality of default logic configurations contained within the default configuration circuitry 132. The programmable logic configuration circuitry 130 programs the programmable logic circuitry 110 to perform at least one predetermined function within the signal processor 100.

In certain embodiments of the invention, the programmable logic configuration circuitry 130 selects an alternative logic configuration using the adaptive configuration circuitry 134. The adaptive configuration circuitry 134 selects the alternative logic configuration in response to a number of factors including, among other things, a plurality of input data that is given to the signal processor 100. In other embodiments of the invention, the adaptive configuration circuitry 134 selects the alternative logic configuration in response to the amount of power being consumed by the signal processor 100. This determination of the amount of power being consumed is made using the processing power consumption analysis circuitry 120. Regardless of what specific parameters are used to identify and select an appropriate logic configuration, the programmable logic configuration circuitry 130 programs the programmable logic circuitry 110 to perform the predetermined functionality of the signal processor 100.

The active configuration circuitry 136 of the programmable logic configuration circuitry 130 is the actual configuration that is presently being employed by the signal processor 100. That is to say, the active configuration circuitry 136 performs the actual logic configuration of the signal processor 100 during real time operation. If desired in certain embodiments of the invention, the loading configuration circuitry (buffer) 138 is simultaneously loading another logic configuration into the programmable logic configuration circuitry 130 while the active configuration circuitry 136 is busy configuring the programmable logic configuration circuitry 130 using either the default configuration circuitry 132 or the adaptive configuration circuitry 134, depending on the specific application. The implementation of both the active configuration circuitry 136 and the loading configuration circuitry (buffer) 138 is performed in a "ping-pong" style operation known to those having skill in the art of logic configuring, data management, and data processing, among other things.

In this embodiment, the programmable logic configuration circuitry 130 employs the active configuration circuitry 136 to perform the actual logic configuration of the signal processor 100 while the loading configuration circuitry (buffer) 138 is loading a logic configuration to be used next. Then, after the present logic configuration of the programmable logic configuration circuitry 130 has been loaded by the active configuration circuitry 136 to process a first plurality of input data, the next logic configuration that was just previously contained within the loading configuration circuitry (buffer) 138 is then passed to the active configuration circuitry 136 to perform processing on a next plurality of input data. If desired, various logic configurations are used to perform processing on the same plurality of input data, and in such a case, the present and the next logic configurations are used to configure the programmable logic configuration circuitry 130 at various phases within the processing of the same plurality of input data. The simultaneous operation of the programming of one logic configuration to the programmable logic configuration circuitry 130 using the active configuration circuitry 136 while another logic configuration is being loaded into the loading configuration circuitry (buffer) 138 provides for faster, overall operation of the signal processor 100, given that a next logic configuration is immediately ready for the programmable logic configuration circuitry 130 after the processing of the plurality of input data.

Figure 2:
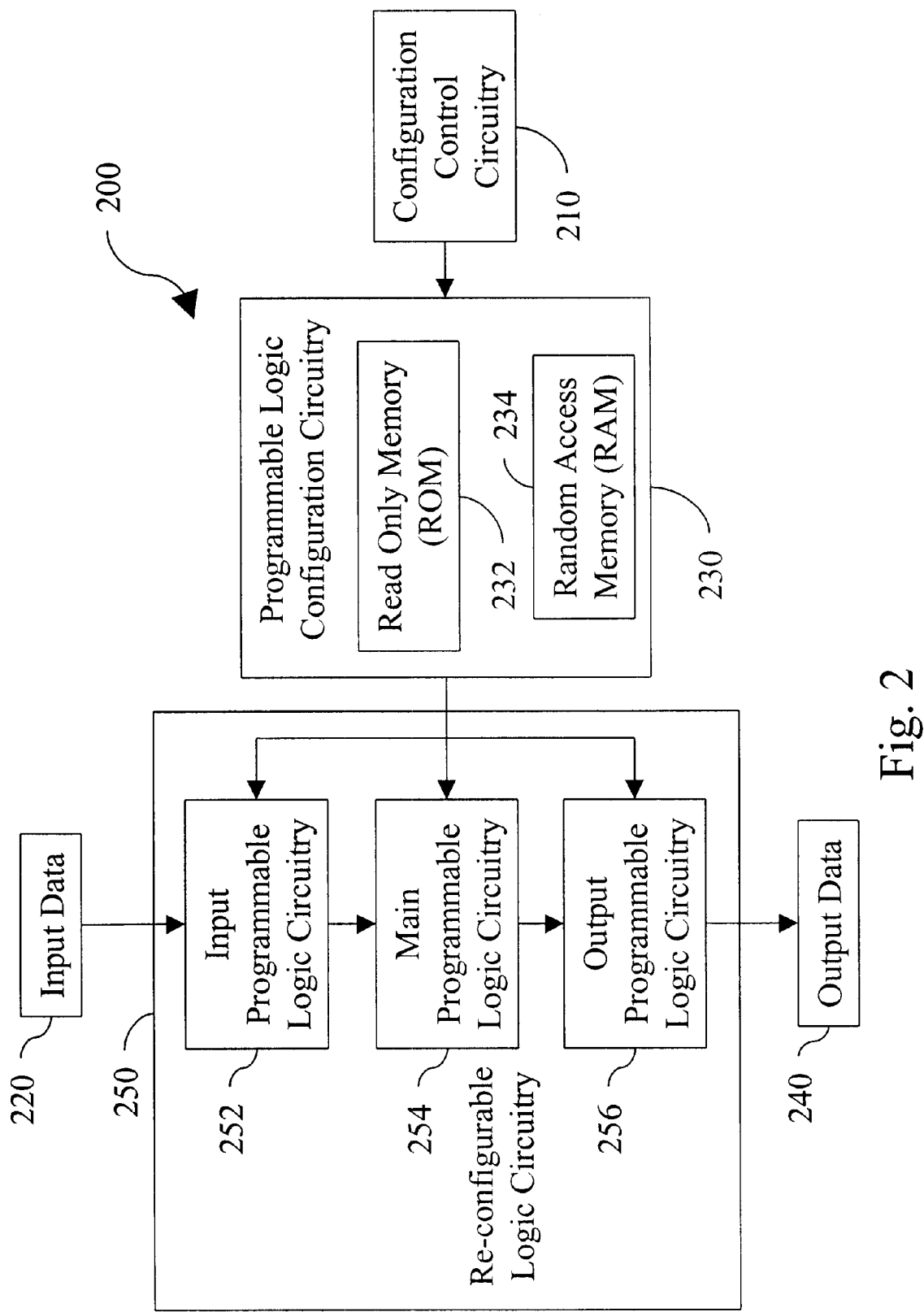
FIG. 2 is a system diagram illustrating a signal processor built in accordance with the invention having a re-configurable logic circuitry governed by a configuration control circuitry.

FIG. 2 is a system diagram illustrating a signal processor 200 built in accordance with the invention having a re-configurable logic circuitry 250 governed by a configuration control circuitry 210. The signal processor 200 operates to convert a plurality of input data 220 into a plurality of output data 240. The configuration control circuitry 210 operates cooperatively with a programmable logic configuration circuitry 230 to program the re-configurable logic circuitry 250. The programmable logic configuration circuitry 230 itself contains, among other things, a read only memory (ROM) 232 and a random access memory (RAM) 234. The re-configurable logic circuitry 250 itself contains, among other things, an input programmable logic circuitry 252, a main programmable logic circuitry 254, and an output programmable logic circuitry 256. The read only memory (ROM) 232 and the random access memory (RAM) 234 store a predetermined number of logic configurations that are used to program the re-configurable logic circuitry 250. If desired, the read only memory (ROM) 232 store a predetermined number of fixed logic configurations for the re-configurable logic circuitry 250. The fixed logic configurations includes at least one default logic configuration for the re-configurable logic circuitry 250 that is loaded during startup of the signal processor 200 or, alternatively, during any power cycle or reset operations that the signal processor 200 undergoes. In addition, the random access memory (RAM) 234 operates within the signal processor 200 to determine amore appropriate logic configuration for the re-configurable logic circuitry 250 through adaptive techniques employed by the programmable logic configuration circuitry 230. The programmable logic configuration circuitry 230 analyzes various parameters to determine an appropriate logic configuration for the signal processor 200.

The programmable logic configuration circuitry 230 provides the proper logic configuration to the re-configurable logic circuitry 250. Irrespective of whether the programmable logic configuration circuitry 230 loads a predetermined logic configuration from the read only memory (ROM) 232 or an adaptively selected logic configuration from the random access memory (RAM) 234, the programmable logic configuration circuitry 230 performs the programming of the re-configurable logic circuitry 250 so that the re-configurable logic circuitry 250 operates properly on the plurality of input data 220. The programming of the programmable logic configuration circuitry 230 operates to program the logic configuration for at least one of the input programmable logic circuitry 252, the main programmable logic circuitry 254, and the output programmable logic circuitry 256. In certain embodiments of the invention, all of the input programmable logic circuitry 252, the main programmable logic circuitry 254, and the output programmable logic circuitry 256 are provides with a logic configuration. In other embodiments of the invention, only one of the input programmable logic circuitry 252, the main programmable logic circuitry 254, and the output programmable logic circuitry 256 is provided with a modified logic configuration to perform processing on the plurality of input data 220. For example, when the signal processor 200 performs updating of new logic configurations during each passing of a clock signal's cycle of the signal processor 200, the logic configurations of each of the input programmable logic circuitry 252, the main programmable logic circuitry 254, and the output programmable logic circuitry 256 is analyzed to determine if the present logic configuration is appropriate for the particular segment of the plurality of input data 220 on which the signal processor 200 is operating. If it is determined that existing logic configuration for at least one of the input programmable logic circuitry 252, the main programmable logic circuitry 254, and the output programmable logic circuitry 256 is appropriate for the plurality of input data 220 within the given clock signal's cycle, then that particular logic configuration is maintained. Alternatively, the logic configurations of the input programmable logic circuitry 252, the main programmable logic circuitry 254, and the output programmable logic circuitry 256 that need to be modified are indeed modified, as required and governed by the plurality of input data 220. The signal processor 200 then utilizes the logic configurations to generate the plurality of output data 240.

Those having skill in the art of data processing will recognize that the various portions of the re-configurable logic circuitry 250 are re-configurable to accommodate various types of the plurality of input data 220. If desired, the signal processor 200 operates into a low power consumption mode wherein default logic configurations are loaded into each of the input programmable logic circuitry 252, the main programmable logic circuitry 254, and the output programmable logic circuitry 256. Various intelligence is employed in the programmable logic configuration circuitry 230 to determine, in various low power consumption modes, whether it is more power efficient to switch to a new logic configuration for at least one of the input programmable logic circuitry 252, the main programmable logic circuitry 254, and the output programmable logic circuitry 256 within the re-configurable logic circuitry 250 or to remain with a default logic configuration. In addition, those having skill in the art of data processing will recognize that various permutations of the modification of the logic configuration of the re-configurable logic circuitry 250 is performed depending on various operational considerations of the signal processor 200.

Figure 3:
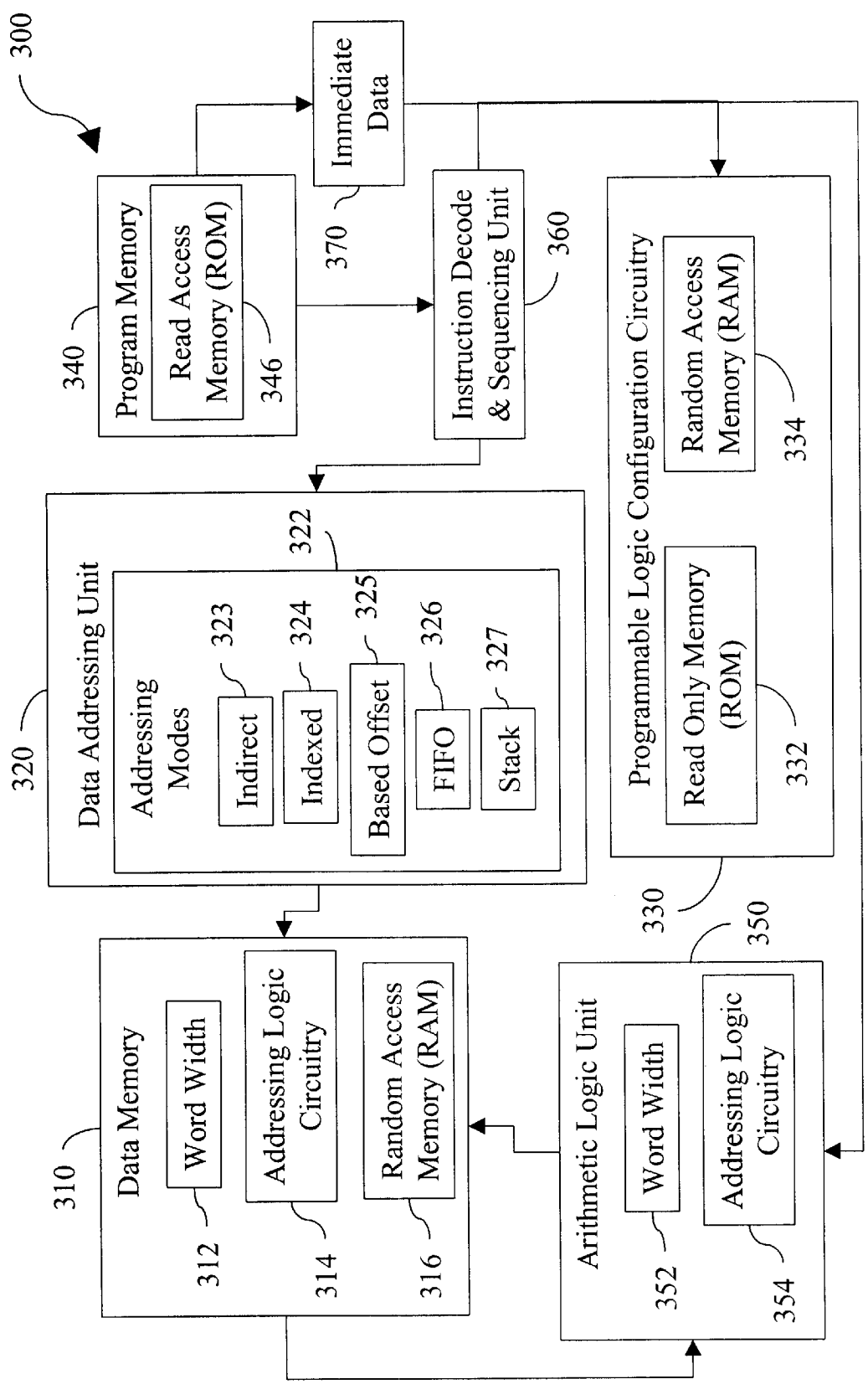
FIG. 3 is a system diagram illustrating a signal processor built in accordance with the invention having a plurality of reconfigurable components.

FIG. 3 is a system diagram illustrating a signal processor 300 built in accordance with the invention having a plurality of reconfigurable components. A programmable logic configuration circuitry 330 is operable to provide configuration to each of a data memory 310, a data addressing unit 320, a program memory 340, an arithmetic logic unit 350, and an instruction decode & sequencing unit 360; the programmable logic configuration circuitry 330 is operable to provide updated configuration for each of the above mentioned reconfigurable components. The programmable logic configuration circuitry 330 itself contains, among other things, a read only memory (ROM) 332 and a random access memory (RAM) 334. As described above and similar to the various embodiments of the invention including the signal processor 100 and the signal processor 200, the signal processor 300 is operable using the programmable logic configuration circuitry 330 to perform both default and adaptive configuration of the various reconfigurable components contained within the signal processor 300.

The data memory 310 itself contains, among other things, a word width 312, an addressing logic circuitry 314, and a random access memory (RAM) 316. The data addressing unit 320 itself contains, among other things, a plurality of addressing modes 322 wherein the plurality of addressing modes 322 include, among other addressing modes, an indirect addressing mode 323, an indexed addressing mode 324, a based offset addressing mode 325, a first in/first out (FIFO) addressing mode 326, and a stack addressing mode 327. The program memory 340 itself contains, among other things, a read only memory (ROM) 346. The program memory 340 provides a plurality of immediate data 370 that is stored in the program memory 340 to the arithmetic logic unit 350, and the instruction decode & sequencing unit 360. The arithmetic logic unit 350 itself contains, among other things, a word width 352 and an addressing logic circuitry 354. The various data addressing mode functionality of the data addressing unit 320 are known to those having skill in the art of data processing. Any appropriate data addressing mode is used within the invention without departing from the scope and spirit thereof. The word width 312 of the data memory 310 and the word width 352 of the arithmetic logic unit 350 correspond to a word width in which each of the data memory 310 and the arithmetic logic unit 350 is configured within one given updating logic configuration step. When the programmable logic configuration circuitry 330 operates to modify the logic configuration of each of the data memory 310, the data addressing unit 320, the program memory 340, the arithmetic logic unit 350, and the instruction decode & sequencing unit 360, a wide word width that is loaded in parallel is used so that all of the configuration of the above mentioned reconfigurable components are re-configured simultaneously, if desired. In certain embodiments of the invention, only a subset of the data memory 310, the data addressing unit 320, the program memory 340, the arithmetic logic unit 350, and the instruction decode & sequencing unit 360 is updated with a new logic configuration in any given logic configuration updating performed by the programmable logic configuration circuitry 330 of the signal processor 300. The variations of the invention, as described above in the embodiments of the signal processor 100 of FIG. 1 and the signal processor 200 of FIG. 2, wherein only various elements of the signal processor 300 receive a modified logic configuration in a clock signal's cycle.

The addressing logic circuitry 314 of the data memory 310 and the addressing logic circuitry 354 of the arithmetic logic unit 350 operate to perform the addressing of modified and updated logic configurations within the signal processor 300 as required by various parameters including characteristics of a plurality of input data, similar to the embodiment shown above and described within the signal processor 200 of FIG. 2.

Figure 4:
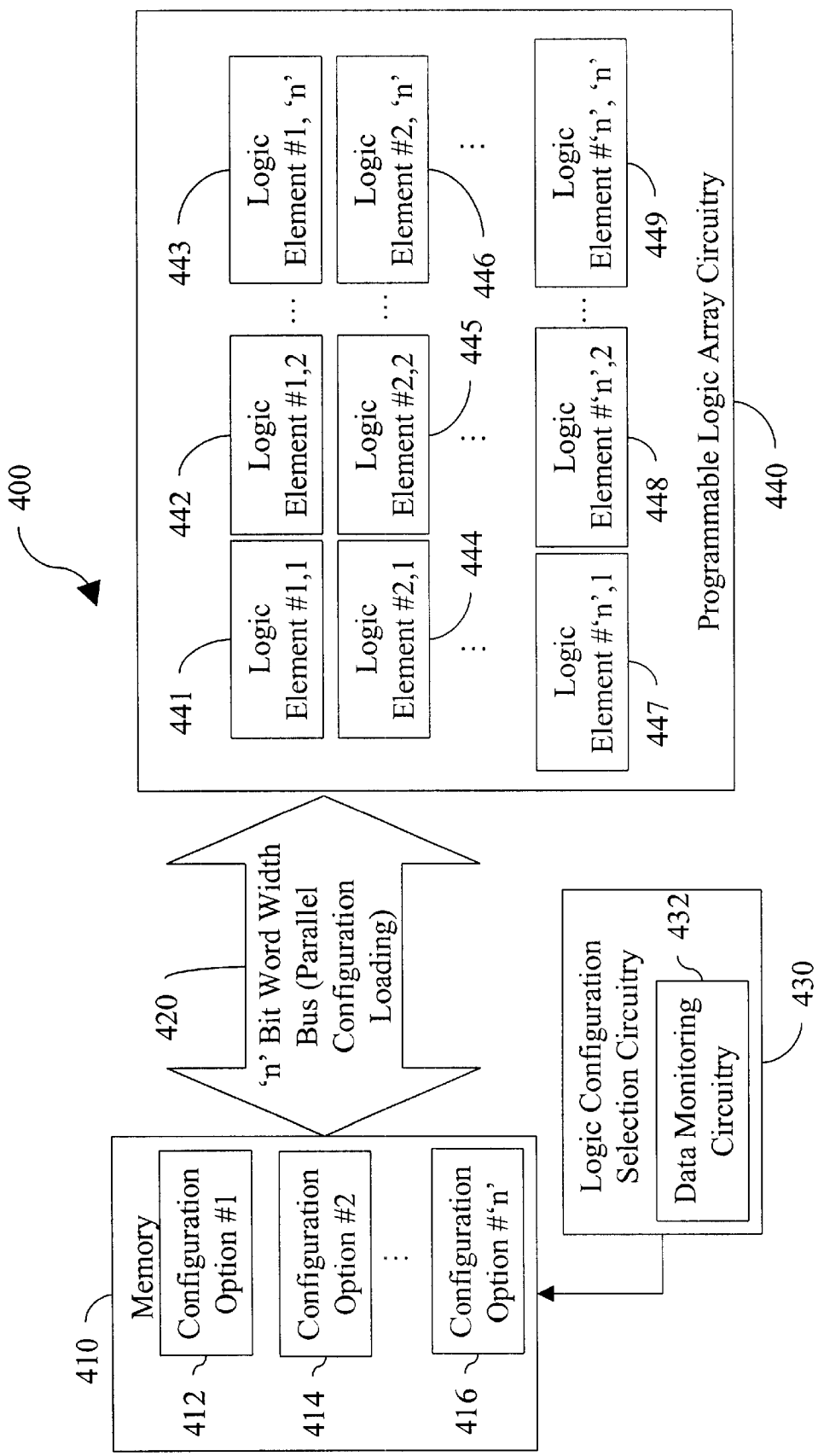
FIG. 4 is a system diagram illustrating a signal processor built in accordance with the invention that selects at least one configuration option to program a programmable logic array circuitry.

FIG. 4 is a system diagram illustrating a signal processor 400 built in accordance with the invention that selects at least one configuration option to program a programmable logic array circuitry 440. The signal processor 400 contains, among other things, a memory 410, an 'n' bit word width bus that performs parallel configuration loading 420, a logic configuration selection circuitry 430, and the programmable logic array circuitry 440. The memory 410 contains, among other things, a configuration option #1 412, a configuration option #2 414, and a configuration option #'n' 416. The logic configuration selection circuitry 430, that itself contains, among other things, a data monitoring circuitry 432, provides information to the memory 410 to determine which logic configuration is appropriate for a given portion of data. The given portion of data is a plurality of input data, as described above in the various embodiments of the invention shown in FIGS. 2 and 3. The data monitoring circuitry 432 is operable to identify characteristics of the plurality of input data and to provide information to the logic configuration selection circuitry 430 so that it operates to perform selection of a logic configuration that is most appropriate. The logic configuration selection circuitry 430 cooperates with the memory 410, selecting from among the configuration option #1 412, the configuration option #2 414, and the configuration option #'n' 416 to identify an appropriate logic configuration for the plurality of input data. As described above in various embodiments of the invention, the selection of the appropriate logic configuration is made using various indicia in accordance with the invention. Examples of such indicia and parameters include power consumption within the signal processor 400, the characteristics of the plurality of input data provided to the signal processor 400, and other parameters.

The selected logic configuration, selected from among the configuration option #1 412, the configuration option #2 414, and the configuration option #'n' 416 contained within the memory 410, is transported to the programmable logic array circuitry 440 via the 'n' bit word width bus that performs parallel configuration loading 420. The 'n' bit word width of the 'n' bit word width bus that performs parallel configuration loading 420 provides very fast loading and configuration of the programmable logic array circuitry 440. For example, for embodiments of the invention where the width of the programmable logic array circuitry 440 is also 'n' bits, the entirety of the programmable logic array circuitry 440 is programmable with a modified logic configuration within a given clock signal's cycle, i.e., all of the logic elements of the programmable logic array circuitry 440 are re-programmable in one given step. The programmable logic array circuitry 440 itself contains, among other things, a plurality of logic elements including a logic element #1,1 441, a logic element #1,2 442, a logic element #1,'n' 443, a logic element #2,1 444, a logic element #2,2 445, a logic element #2,'n' 446, a logic element #'n',1 447, a logic element #'n',2 448, and a logic element #'n','n' 449.

In other embodiments of the invention, the width of the programmable logic array circuitry 440 is 'n' bits that is different than the 'n' bit word width of the 'n' bit word width bus that performs parallel configuration loading 420 and only a predetermined portion of the individual logic elements of the programmable logic array circuitry 440 is programmed with a modified logic configuration in the given clock signal's cycle. Additional clock signal cycles are required to modify the logic configuration of the remainder of the programmable logic array circuitry 440.

Figure 5:
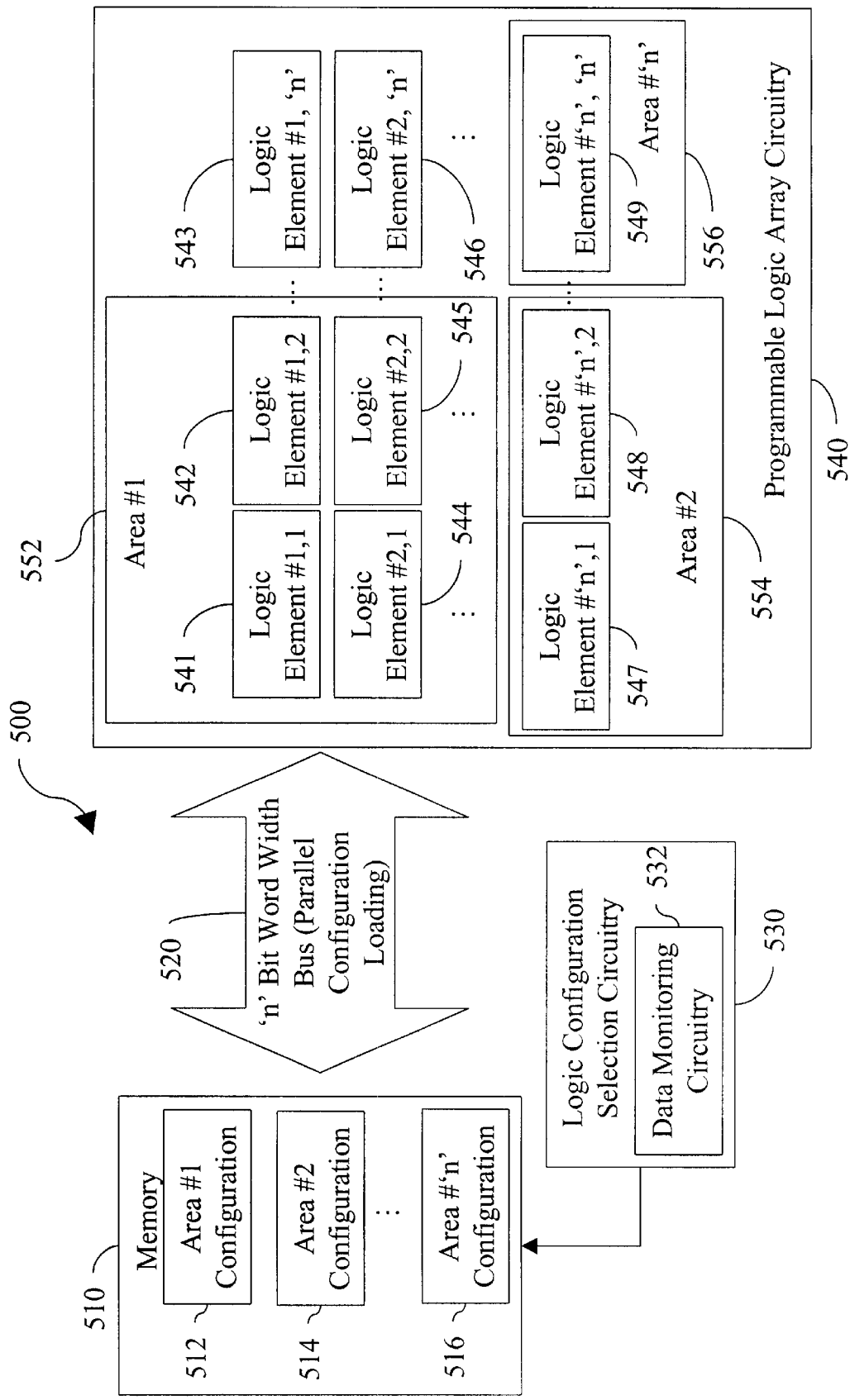
FIG. 5 is a system diagram illustrating a signal processor built in accordance with the invention that selects at least one area configuration to program at least one area of a programmable logic array circuitry.

FIG. 5 is a system diagram illustrating a signal processor 500 built in accordance with the invention that selects at least one area configuration to program at least one area of a programmable logic array circuitry. The signal processor 500 contains, among other things, a memory 510, an 'n' bit word width bus that performs parallel configuration loading 520, a logic configuration selection circuitry 530, and a programmable logic array circuitry 540. The memory 510 contains, among other things, a configuration option #1 512, a configuration option #2 514, and a configuration option #'n' 516. The logic configuration selection circuitry 530, that itself contains, among other things, a data monitoring circuitry 532, provides information to the memory 510 to determine which logic configuration is appropriate for a given portion of data. Similar to the embodiment of the invention described above in the signal processor 400 of FIG. 4, the given portion of data is a plurality of input data, as described above in the various embodiments of the invention shown in FIGS. 2 and 3. The data monitoring circuitry 532 is operable to identify characteristics of the plurality of input data and to provide information to the logic configuration selection circuitry 530 so that it operates to perform selection of a logic configuration that is most appropriate. The logic configuration selection circuitry 530 cooperates with the memory 510, selecting from among the configuration option #1 512, the configuration option #2 514, and the configuration option #'n' 516 to identify an appropriate logic configuration for the plurality of input data. As described above in various embodiments of the invention, the selection of the appropriate logic configuration is made using various indicia in accordance with the invention. Examples of such indicia and parameters include power consumption within the signal processor 500, the characteristics of the plurality of input data provided to the signal processor 500, and other parameters.

The selected logic configuration, selected from among the configuration option #1 512, the configuration option #2 514, and the configuration option #'n' 516 contained within the memory 510, is transported to the programmable logic array circuitry 540 via the 'n' bit word width bus that performs parallel configuration loading 520. The 'n' bit word width of the 'n' bit word width bus that performs parallel configuration loading 520 provides very fast loading and configuration of the programmable logic array circuitry 540. For example, for embodiments of the invention where the width of the programmable logic array circuitry 540 is also 'n' bits, the entirety of the programmable logic array circuitry 540 is programmable with a modified logic configuration within a given clock signal's cycle, i.e., all of the logic elements of the programmable logic array circuitry 540 are re-programmable in one given step. The programmable logic array circuitry 540 itself contains, among other things, a plurality of logic elements including a logic element #1,1 541, a logic element #1,2 542, a logic element #1,'n' 543, a logic element #2,1 544, a logic element #2,2 545, a logic element #2,'n' 546, a logic element #'n',1 547, a logic element #'n',2 548, and a logic element #'n','n' 549.

In the specific embodiment of the signal processor 500, the programmable logic array circuitry 540 is not only partitioned into the logic element #1,1 541, the logic element #1,2 542, the logic element #1,'n' 543, the logic element #2,1 544, the logic element #2,2 545, the logic element #2,'n' 546, the logic element #'n',1 547, the logic element #'n',2 548, and the logic element #'n','n' 549, but the programmable logic array circuitry 540 is further organized into an area #1 552, an area#2 554, and an area #'n' 556. The area #1 552 contains the logic element #1,1 541, the logic element #1,2 542, the logic element #2,1 544, and the logic element #2,2 545; the area #2 554 contains the logic element #'n',1 547 and the logic element #'n',2 548; the area #'n' 556 contains the logic element #'n','n' 549. The signal processor 500 is operable to provide various logic configurations to each of the area #1 552, the area #2 554, and the area #'n' 556 as required by the specific application. For example, in a given instance, for a given plurality of input data, only the area #1 552 and the area #2 554 need to be provided a modified logic configuration whereas the logic configuration of the area #'n' 556 is appropriate for the given application. Those having skill in the art of data processing will recognize that the logic element #1,'n' and the logic element #2,'n' may be organized into another area in certain embodiments of the invention. The the logic element #1,1 541, the logic element #1,2 542, the logic element #1,'n' 543, the logic element #2,1 544, the logic element #2,2 545, the logic element #2,'n' 546, the logic element #'n',1 547, the logic element #'n',2 548, and the logic element #'n','n' 549 is operable to be organized into any number of individual areas such that predetermined logic configurations are loaded into the various areas of the programmable logic array circuitry 540 for processing within the signal processor 500.

Figure 6:
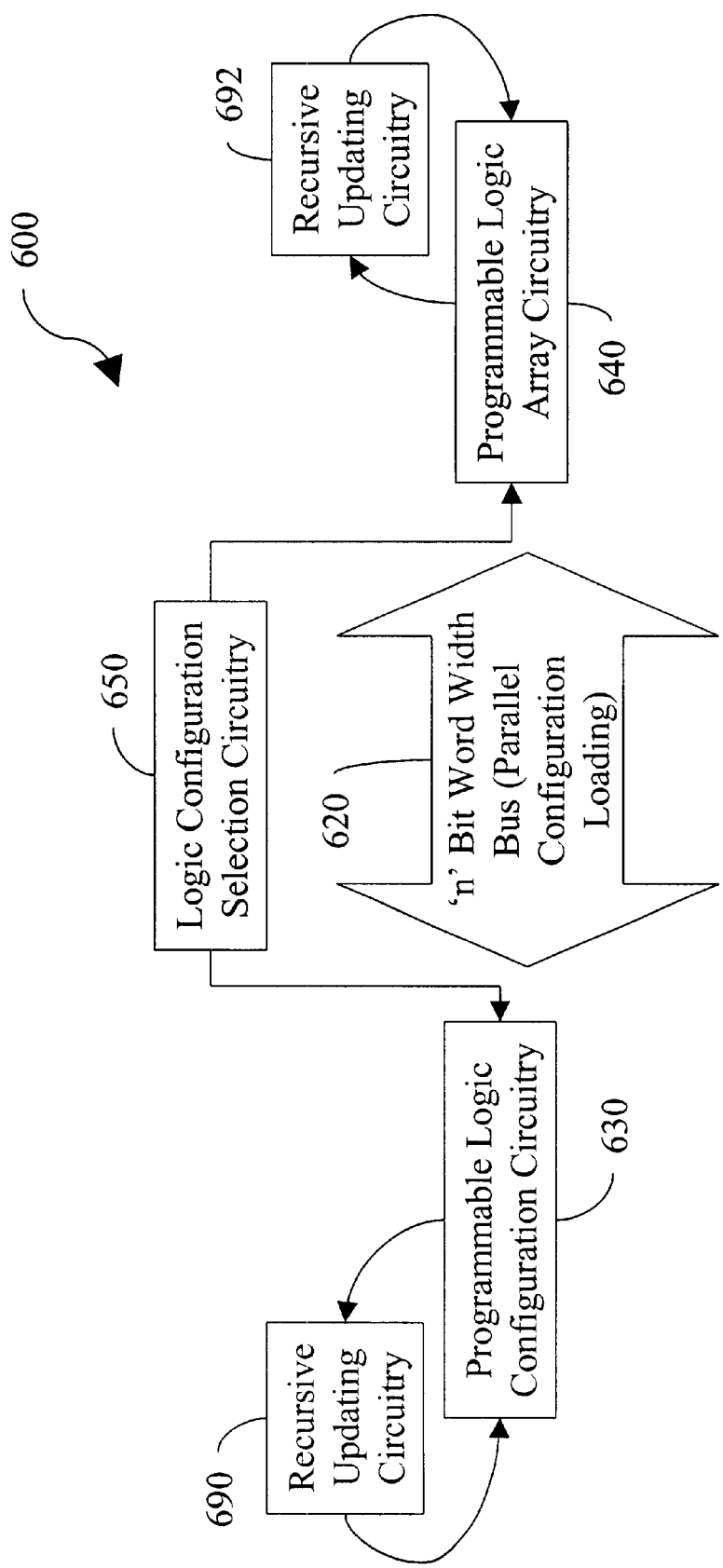
FIG. 6 is a system diagram illustrating a signal processor built in accordance with the invention that performs recursive updating of a programmable logic configuration circuitry and a programmable logic array circuitry.

FIG. 6 is a system diagram illustrating a signal processor 600 built in accordance with the invention that performs recursive updating of a programmable logic configuration circuitry 630 and a programmable logic array circuitry 640. The signal processor 600 contains, among other things, a logic configuration selection circuitry 650 that is coupled to a programmable logic configuration circuitry 630 and a programmable logic array circuitry 640. The programmable logic configuration circuitry 630 and the programmable logic array circuitry 640 are additionally coupled to one another via an 'n' bit word width bus that performs parallel configuration loading 620. The logic configuration selection circuitry 650 selects from the programmable logic configuration circuitry 630 a logic configuration that is appropriate for the signal processor 600. In performing this selection, the signal processor 600 utilized information of the existing logic configuration programmed in the programmable logic array circuitry 640. In addition, in the selection of an appropriate logic configuration, selected from the programmable logic configuration circuitry 630, and the updating of the selected logic configuration into the programmable logic array circuitry 640 are each performed using a recursive updating circuitry 690 and a recursive updating circuitry 692, respectively. That is to say, adaptive logic configuration is supportable within the programmable logic configuration circuitry 630 using the recursive updating circuitry 690 as required by the specific application of the signal processor 600. For example, a "new" logic configuration is achieved within the programmable logic configuration circuitry 630, even if it is not originally loaded into the programmable logic configuration circuitry 630 at the inception of the operation of the signal processor 600. That is to say, the "new" logic configuration is generated in real time operation of the signal processor 600 to accommodate an immediate logic configuration within the programmable logic array circuitry 640. The "new" logic configuration is adaptively generated specifically for the plurality of input data that is fed into the signal processor 600. As required by a number of parameters including a plurality of input data, the power consumption of the signal processor 600, or other parameters, the "new" logic configuration of the signal processor 600 is appropriately chosen for the present application.

In certain embodiments of the invention, the recursive updating circuitry 690 and the recursive updating circuitry 692 operate cooperatively to perform recursive updating of the programmable logic configuration circuitry 630 and the programmable logic array circuitry 640. Alternatively, the recursive updating circuitry 690 and the recursive updating circuitry 692 operate independently to perform recursive updating of the programmable logic configuration circuitry 630 and the programmable logic array circuitry 640 based upon various parameters including, among other things, the type of incoming data on which the signal processor 600 will operate and a most efficient logic array configuration that is identified by the logic configuration selection circuitry 650.

Figure 7:
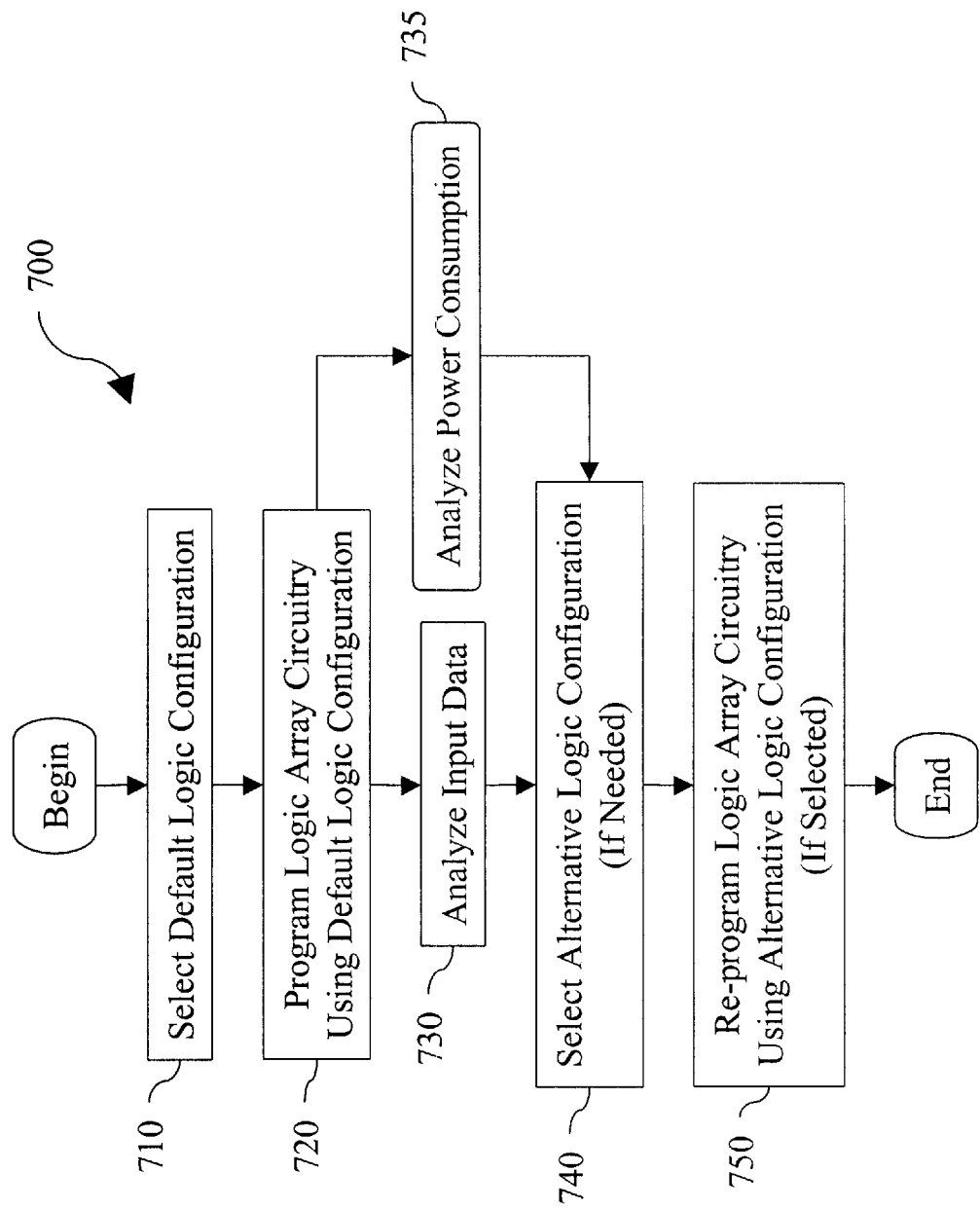
FIG. 7 is a functional block diagram illustrating a method performed in accordance with the invention that reconfigures a logic array circuitry.

FIG. 7 is a functional block diagram illustrating a method 700 performed in accordance with the invention that reconfigures a logic array circuitry. In a block 710, a default logic configuration is selected from among a plurality of predetermined logic configurations. In a block 720, a logic array circuitry is programmed using the default logic configuration that is selected in the block 710. In a block 730, a plurality of input data in analyzed to determine if the default logic configuration that is selected in the block 710 is appropriate. In an alternative process block 735, a power consumption of a signal processor is analyzed to perform the determination whether the default logic configuration that is selected in the block 710 is appropriate. Subsequently and irrespective of which of the block 730 and the alternative process block 735 is performed, an alternative logic configuration is selected in a block 740. In certain applications of the invention, the already selected default logic configuration selected in the block 710 is appropriate. In such an instance, the alternative logic configuration need not be selected in the block 740.

However, if the already selected default logic configuration selected in the block 710 is inappropriate or if the processing of a signal processor is improved as determined by the analysis of the plurality of input data in the block 730 or the analysis of the power consumption in the alternative process block 735, an alternative logic configuration is selected in the block 740 that is more appropriately geared for the plurality of input data that is analyzed in the block 730 or more appropriately geared for the power consumption that is analyzed in the block 735. Finally, in a block 750, the logic array circuitry is re-programmed using the alternative logic configuration that is selected in the block 740. As described above, if it is determined that an alternative logic configuration is not needed in the block 740, then no re-programming is performed in the block 750. However, in those instances where re-programming is required as determined by the selection of an alternative logic configuration in the block 740, the re-programming of the logic array circuitry is performed in the block 750.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A configuration controller that selects at least one logic configuration, comprising:
   programmable logic configuration circuitry comprising:
      default configuration circuitry providing one or more default logic configurations;

adaptive configuration circuitry selecting one or more predetermined alternative logic configuration;

an 'a' bit word width bus coupled to the adaptive configuration circuitry, wherein the width of the 'n' bit word width bus is adjusted to carry data representative of each of the one or more alternative logic configuration selections in parallel; and power consumption analysis circuitry providing power consumption analysis data to the default configuration circuitry and he adaptive configuration circuitry, wherein the at least one logic configuration is selected to reduce power consumption.

2. The configuration controller of claim 1 further comprising:

a data memory, a data addressing unit, an arithmetic logic unit, and an instruction decode and sequencing unit; and wherein each of the data memory, the data addressing unit, the arithmetic logic unit, and the instruction decode and sequencing unit is communicatively coupled to the programmable logic configuration circuitry and is independently programmable using the programmable logic configuration circuitry.

3. The configuration controller of claim 1, wherein the configuration controller employs a wide word width to program the re-configurable logic circuitry, the wide word width is operable to configure an entirety of the re-configurable logic circuitry.

4. The configuration controller of claim 1 further comprising re-configurable logic circuitry partitioned into a plurality of areas, where each area within the plurality of areas is independently programmable.

5. The configuration controller of claim 4, wherein the programmable logic configuration circuitry loads a default logic configuration into the re-configurable logic circuitry.

6. The configuration controller of claim 5 wherein the default logic configuration is stored in memory.

7. The configuration controller of claim 1, wherein the configuration controller generates an adaptive logic configuration.

8. The configuration controller of claim 7, wherein the adaptive logic configuration is generated using a processing circuitry.

9. The configuration controller of claim 7, further comprising a data monitoring circuitry that generates the adaptive logic configuration in response to at least one characteristic of a plurality of data.

10. Programmable logic circuitry that operates on a plurality of data comprising:

a programmable logic configuration circuitry that provides one or more logic configurations to the programmable logic circuitry;

an 'n' bit word width bus coupled to the adaptive configuration circuitry, wherein a width of the 'n' bit word width bus is adjusted to carry data representative of each of the one or more alternative logic configuration selections in parallel;

power consumption analysis circuitry generating power consumption analysis data; and wherein the programmable logic configuration circuitry modifies the logic configuration based on the power consumption analysis data so as to reduce power.

11. The programmable logic circuitry of claim 10, wherein the programmable logic configuration circuitry employs a wide word width to program the programmable logic circuitry, the wide word width is operable to configure an entirety of the programmable logic circuitry.

12. The programmable logic circuitry of claim 10, wherein the programmable logic configuration circuitry further comprises:

a default configuration circuitry; and an adaptive configuration circuitry.

13. The programmable logic circuitry of claim 12, wherein the default configuration circuitry contains a default logic configuration for the programmable logic circuitry.

14. The programmable logic circuitry of claim 12, wherein the adaptive configuration circuitry generates an adaptive logic configuration for the programmable logic circuitry.

15. The programmable logic circuitry of claim 10, wherein the programmable logic circuitry is partitioned into a plurality of areas, each area within the plurality of areas is independently programmable.

16. A method that provides a logic configuration to a programmable logic circuitry comprising:

generating power consumption data using such power consumption analysis circuitry;

modifying the logic configuration based on the power consumption data by selecting one of two or more predetermined logic configurations to reduce power consumption;

determining a width required to transmit logic array configuration data;

transmitting the logic array configuration data over an 'n' bit width bus; and programming a logic array circuitry using the logic configuration.

17. The method of claim 16 wherein the logic configuration is a default logic configuration.

18. The method of claim 16 wherein the logic configuration is an adaptive logic configuration.

19. The method of claim 16 wherein the logic configuration is provided to the programmable logic circuitry via a wide word width, the wide word width is operable to configure an entirely of the logic array circuitry.

* * * * *